(12) United States Patent
Groves et al.

(10) Patent No.: US 6,373,511 B1
(45) Date of Patent: Apr. 16, 2002

(54) COMBINATION TERMINAL AND PRINTER

(75) Inventors: David Henry Groves, Adjala; Yiu Kong Wong, Richmond Hill, both of (CA); Jerry Crosetti, San Chung (TW); Ki Sheung Yuen, Brampton; Fraser Hardman, Mississauga, both of (CA)

(73) Assignee: IVI Checkmate Corp., Roswell, GA (US)

( * ) Notice: Subject to any disclaimer, the term of this patent is extended or adjusted under 35 U.S.C. 154(b) by 0 days.

(21) Appl. No.: 09/503,332

(22) Filed: Feb. 14, 2000

(51) Int. Cl.[7] .................................................. B41J 2/32
(52) U.S. Cl. ...................................................... 347/198
(58) Field of Search ........................ 347/198; 400/693; 361/683; 235/441, 449; 362/35; 405/15

(56) References Cited

U.S. PATENT DOCUMENTS 5,041,947 A * 8/1991 Yuen et al. .................... 362/35
5,237,487 A * 8/1993 Dittmer et al. ............. 361/683
5,808,283 A * 9/1998 Stanton et al. .............. 235/441
5,912,446 A * 6/1999 Wong et al. ................. 235/449
5,933,812 A * 8/1999 Meyer et al. .................. 705/15
6,004,053 A * 12/1999 Petteruti et al. ............ 400/693

FOREIGN PATENT DOCUMENTS

WO    WO 98/55954    12/1998

* cited by examiner

*Primary Examiner*—N. Le
*Assistant Examiner*—K. Feggins

(57) ABSTRACT

A transaction device comprises a terminal module and printer module mechanically secured in an angled configuration. This angled configuration orientates a touch screen input and display device at an angle to the horizontal to reduce reflected light problems. In addition, the angle orientation of the printer improves space efficiency. A lower surface of the terminal module is easily accessible for connecting the device to other modules or to remote computers.

33 Claims, 15 Drawing Sheets

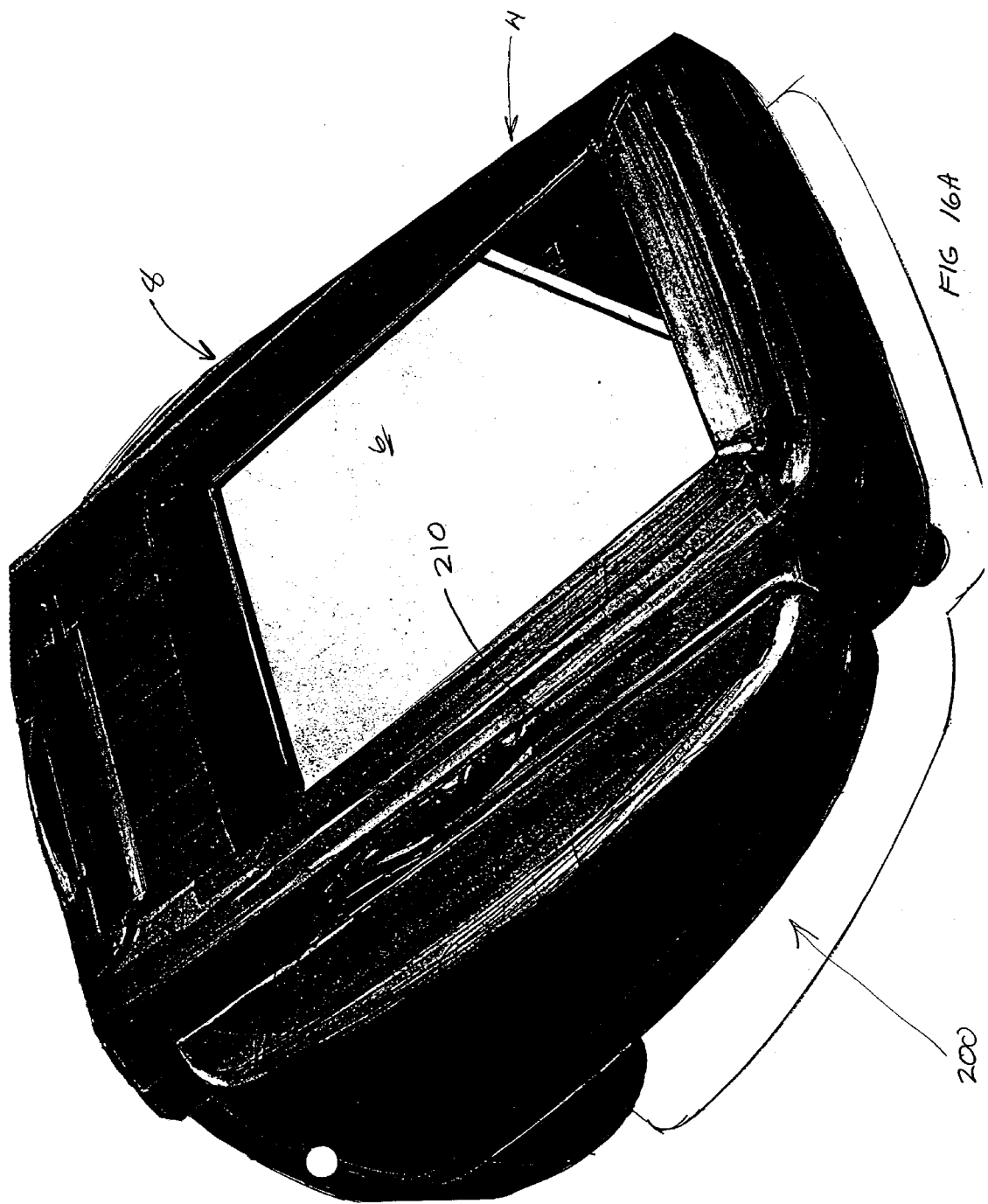

COMBINATION TERMINAL AND PRINTER

BACKGROUND

The present invention relates to transaction terminals requiring a printed report and has particular application with respect to financial transaction terminals requiring a print receipt.

Financial transaction terminals are more desirable when the terminals can accommodate different forms of user payment. The terminals process payment by debit cards where the device reads a magnetic stripe in combination with the user entering an authorized PIN or by conventional credit card payment, cheque payment or smart card payment. A number of modular financial transaction systems which include a processing terminal electrically connected by cables to a printer have been used. Terminals of this type can also be connected to cheque readers, magnetic stripe readers and/or hand held input devices for entry of PIN numbers. Basically, the terminal includes ports for connecting to these accessory devices similar to a small computer system.

A modular system allows the user to connect the particular equipment that has been determined to be necessary, however, such modular systems are not space efficient. To overcome this problem, some modular systems include a specific support arrangement for organizing the individual modules of the system in a more efficient manner. In these modular systems, the terminal modular does the majority of the data processing and communication processing, however, individual modules typically have their own processors for controlling their specific function such as printing or cheque reading. The electrical cable connections between the devices are for exchanging information signals between the processors. With this arrangement, each module is more expensive due to independent processors, however, each module is more independent and requires less interaction with other modules.

Some financial transaction terminals have included touch screens as an input/output device. The use of touch screens simplifies reprogramming and also simplifies entry of information and instructions. Although touch screens have been used before, they have experienced some difficulty in that under some light conditions, the screens are difficult to read and interpret.

The present invention seeks to overcome a number of the deficiencies described above and provide a transaction terminal which is cost effective and convenient to use and service.

SUMMARY OF THE INVENTION

A transaction device according to the present invention comprises a terminal module and a printer module. The terminal module includes a processor, a touch screen input and display means, application memory means, data storage means, an electrical plug type connection for communicating with the printer module, and input and output ports. The printer module includes a paper supply roll support arrangement, a printing head, a paper drive arrangement, a paper outlet and an electrical plug type connection for communicating with the terminal module. The terminal module and the printer module are mechanically secured one to the other at an angle to one another. The transaction device, when supported in an operative orientation on a horizontal surface positions the touch input and display means of the terminal module at an upwardly extending angle relative to the horizontal.

According to an aspect of the invention, the mechanical securement of the two modules also maintains the plug type connection of the printer module in engagement with the plug type connection of the terminal module.

According to a further aspect of the invention, the terminal module includes an injection molded housing and the printer module includes an injection molded housing. These housings include interlocking members which engage and form part of the mechanical securement of the modules.

According to yet a further aspect of the invention, the printer module and the terminal module, when secured, form an electrical cable access gap beneath the terminal module and the printer module.

According to yet a further aspect of the invention, the terminal module, on a bottom surface, includes a recessed cable connection cavity and the input and output ports of the terminal module are located in a wall of this cavity.

According to yet a further aspect of the invention, the recess cavity includes a hinged cover member to enclose the cavity for cable storage and allows passage of cables to and from the base of the transaction device.

According to yet a further aspect of the invention, the printer module of the transaction device has an adjustable support at a rear portion of the printer module which is movable between at least two different support positions. A variation between the two support positions causes the angle of the touch screen input/output display means to vary relative to horizontal, at least 5 degrees. With this arrangement the transaction device can be adjusted to change the angle of the touch screen to minimize problems from reflected light. In a preferred embodiment, the angle of the display screen changes seven degrees.

BRIEF DESCRIPTION OF THE DRAWINGS

Preferred embodiments of the invention are shown in the drawings, wherein:

FIG. 16A is a perspective view showing a cheque reader attached to the side of the printer module;

DETAILED DESCRIPTION OF THE PREFERRED EMBODIMENTS

Figure 1:
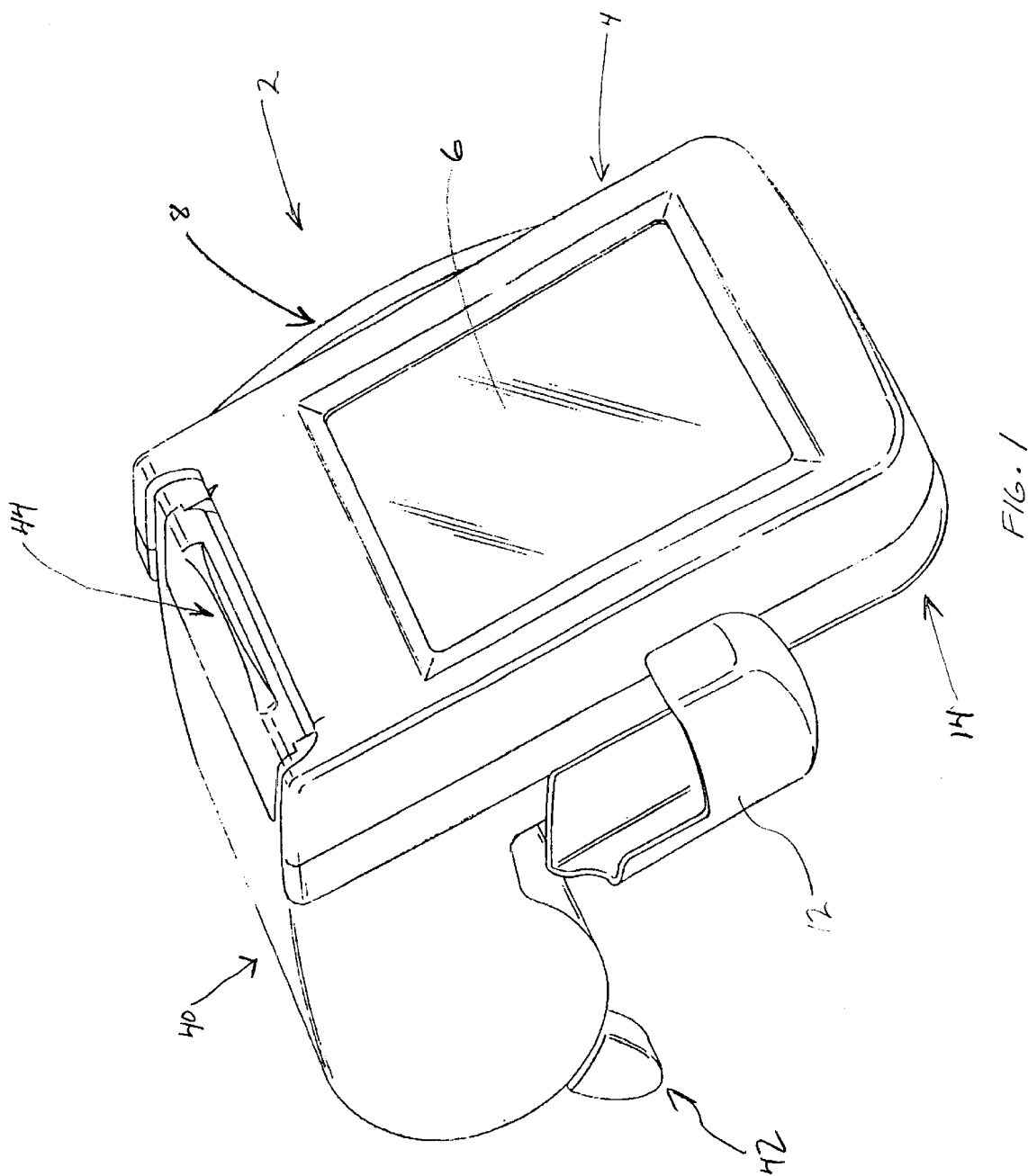
FIG. 1 is a perspective view of the transaction device.

The transaction terminal generally shown as 2 includes a transaction module 4 which is mechanically secured to a printer module 40. The touch screen input/output unit 6 allows the transaction module to display various symbols on the touch screen and the user merely presses on the desired symbols for inputting information and/or instructions. Any required changes to the symbols is a software change and relatively easy to carry out.

The printer module 40 preferably has a large cavity therein for receiving a roll of paper and a thermal print head is provided near the paper discharge port 44. The printer module includes adjustable feet 42 which are movable between two different support positions for altering the angle of the touch screen 6.

The printer module 40 and the transaction module 4 are connected at an approximate 90 degree angle to one another and the transaction device is supported at the front edge 14 of the transaction module and by the adjustable feet 42 located at a rear position of the printer module. With this arrangement, there is a triangular cavity beneath the transaction device used to allow cables to connect to various ports on a bottom surface of the transaction module.

The angled orientation of the terminal and printer modules reduces the size of the area on a counter that the device occupies. The occupied space is typically referred to as the foot print of the device and the angled configuration of the two modules allows the foot print to be relatively small. Angling of the terminal module, angles the touch screen reducing problems associated with reflected light. In addition, the modular design allows separation of the two modules by the user should repair of one of them be required. The generally perpendicular connection is also preferred to ease connection and to form a strong mechanical connection.

A holder 12 is attached to the side of the terminal module and is used for receiving the conventional hand held secure entry pin device 70 for entering of PIN numbers. This device connects with a RS 232 port in the base of the transaction module.

Figure 2:
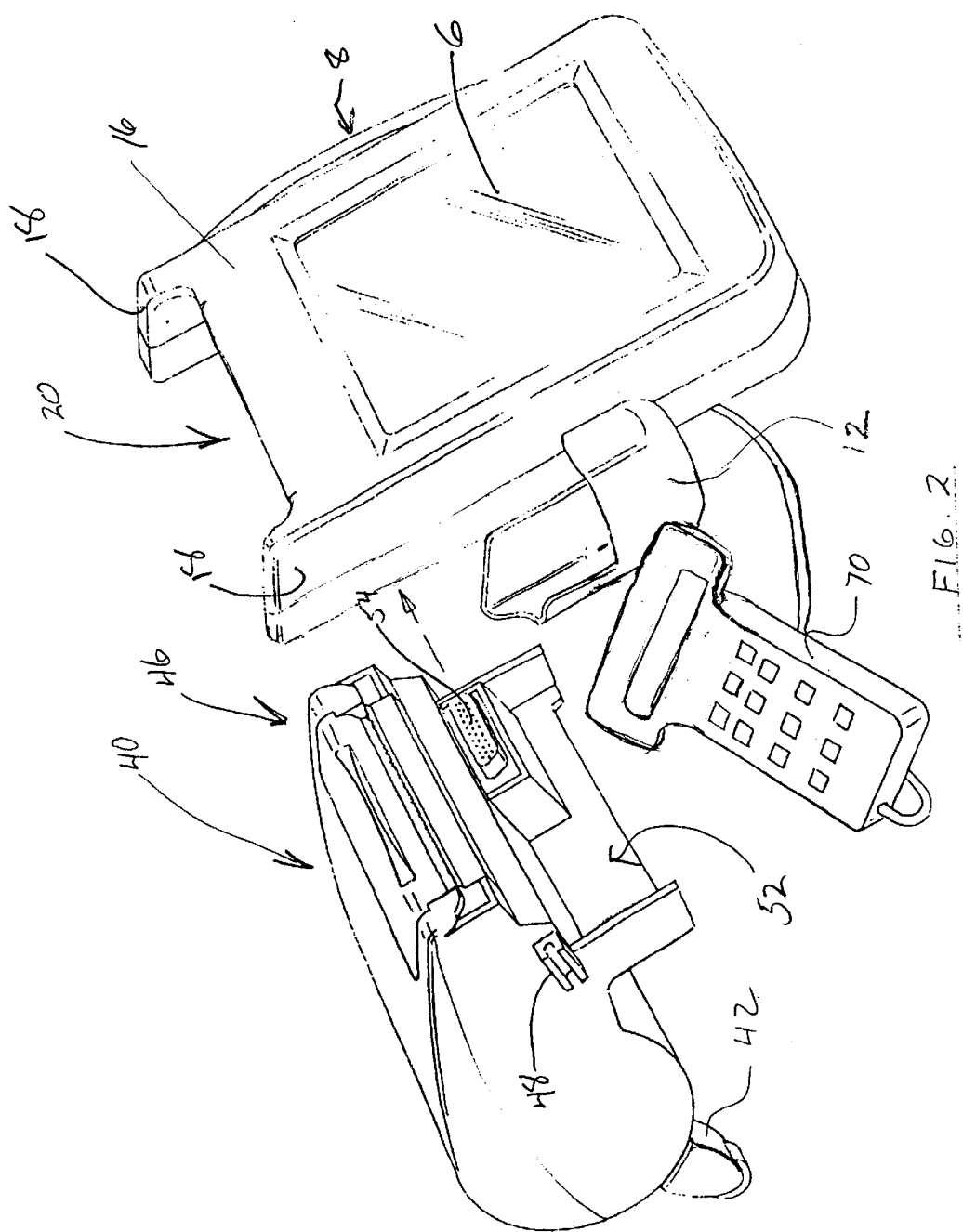
FIG. 2 is an exploded perspective view of the transaction device showing the terminal module and the printer module.

The transaction module 4 is shown separated from the printer module 40 (in FIG. 2). The transaction module includes a molded plastic housing 16 having side extensions 18 and a channel recess 20 at an upper end of the module for receiving the paper discharge end of the printer module 40. The printer module includes a C-shaped flange 52 which mates with a stub block 30 provided on a back surface of the transaction terminal. The printer module also includes a male plug type connector 54 which is received in a female plug type connector provided on the back of the surface of the transaction module when the modules are secured.

Figure 3:
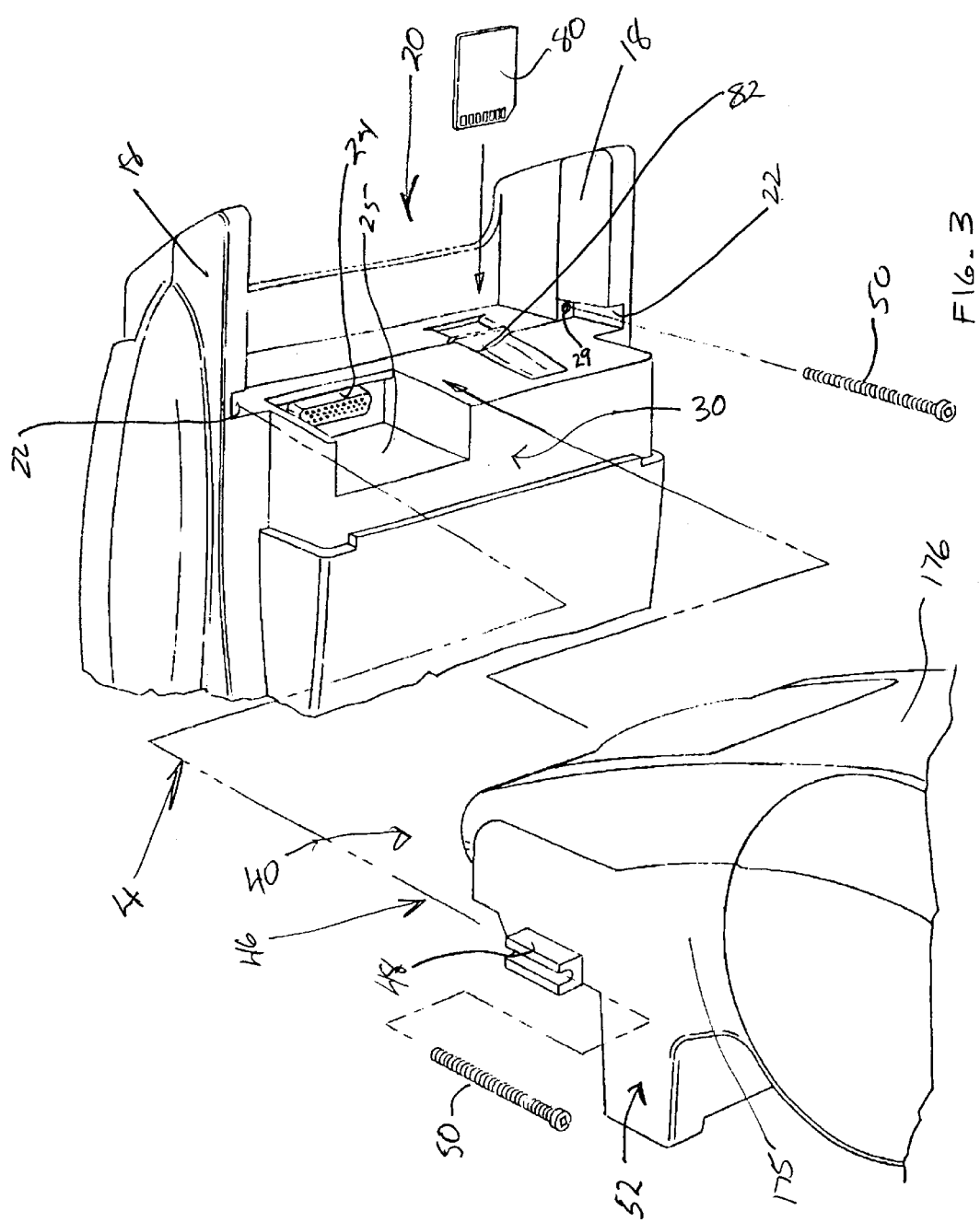
FIG. 3 is a partial exploded perspective view showing the securement of the printer module to the terminal module.

Details of the mechanical securement of the printer module 40 with the terminal module 4 are illustrated in FIG. 3. The transaction module on the back surface thereof includes the stub block 30 which is received in the C-shaped flange 52 of the printer module. The female plug type connector 24 is located in a cavity 25 which allows the male type connector 54 of the print module to engage the connector 24. The side extension members 18 each include near a base portion thereof, a recessed keyway 22 which receives the outwardly extending slide keys 48 of the printer module. These slide keys include a passageway for a bolt 50 to pass therethrough and engage threaded ports 29 in the transaction module.

The actual mechanical securement of the printer module to the transaction module includes a number of cooperating surfaces including the C-shaped flange 52 engaging the stub block 30, the slide keys 48 engaging the recess keyways 22, the interior of the side extension members 18 engaging side portions of the print module, as well as the mechanical securement of the bolts 50 drawing the printer module into engagement with the transaction module.

The removable flash card 80 is received in its associated port 82 and is used by the transaction module. This flash memory card is retained in the transaction module and requires the printer module to be separated from the transaction module to remove the card. This card contains programs, user parameters and transaction records. If there is a problem with the transaction module, this card can be removed and placed in a replacement module. The financial transactions, parameters and operating system are maintained and used by the replacement terminal. Preferably, the card cannot be removed without disconnecting the printer module to provide additional safety against unauthorized removal.

From the above it can be understood that a strong mechanical securement of the printer module 40 to the transaction module 4 has been achieved. Furthermore, once assembled, the modules form a transaction terminal which is similar to an integral terminal but has significant advantages with respect to service and shipping.

Figure 4:
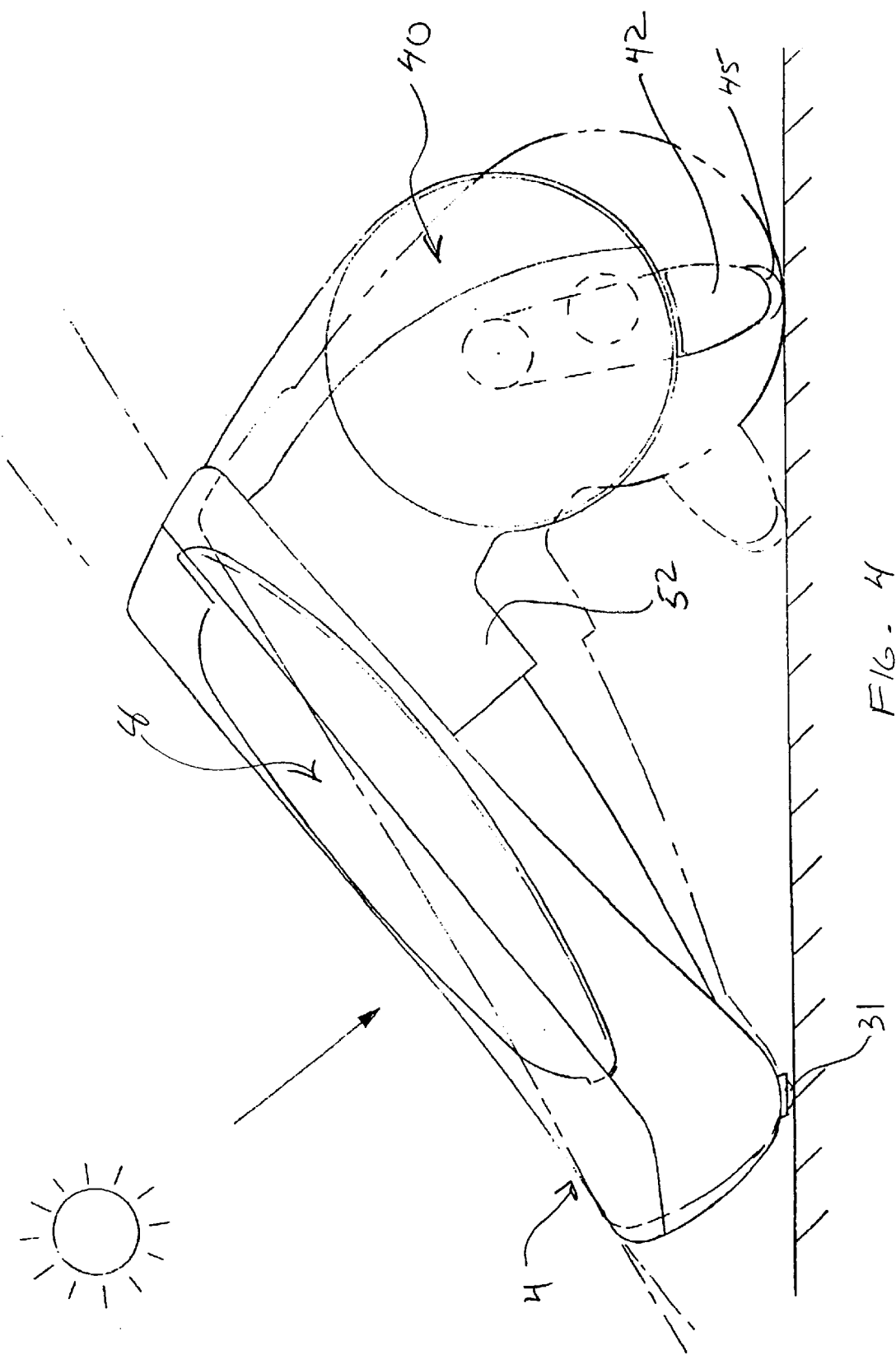
FIG. 4 is a side elevational view showing the transaction device two different support positions.

The assembled transaction module and printer module are shown in the side elevation of FIG. 4. Touch screens often suffer from reflected light problems which render the touch screen difficult to view. The two adjustable feet 42 of the printer module are connected and move as a unit.

The solid lines of FIG. 4 show the feet 42 in an elevated position and the dashed lines show the feet in a lower position where the angle of the touch screen has been reduced. This results in an approximate seven degree variation in the angle of the touch screen between the two positions. It has been found that if there is a reflected light problem in one position rendering the screen difficult to read, then adjustment of the feet to the alternate position changes the angle of the screen about seven degrees and the reflected light problem is overcome. Generally, a variation of the angle of the touch screen of at least five degrees is sufficient.

FIG. 4 also shows the front edge 14 of the transaction terminal having inserted rubber feet 31 for griping with the support surface. Similarly, the adjustable feet 42 include rubber inserts 45 for improving engagement with the supporting horizontal surface.

Figure 5:
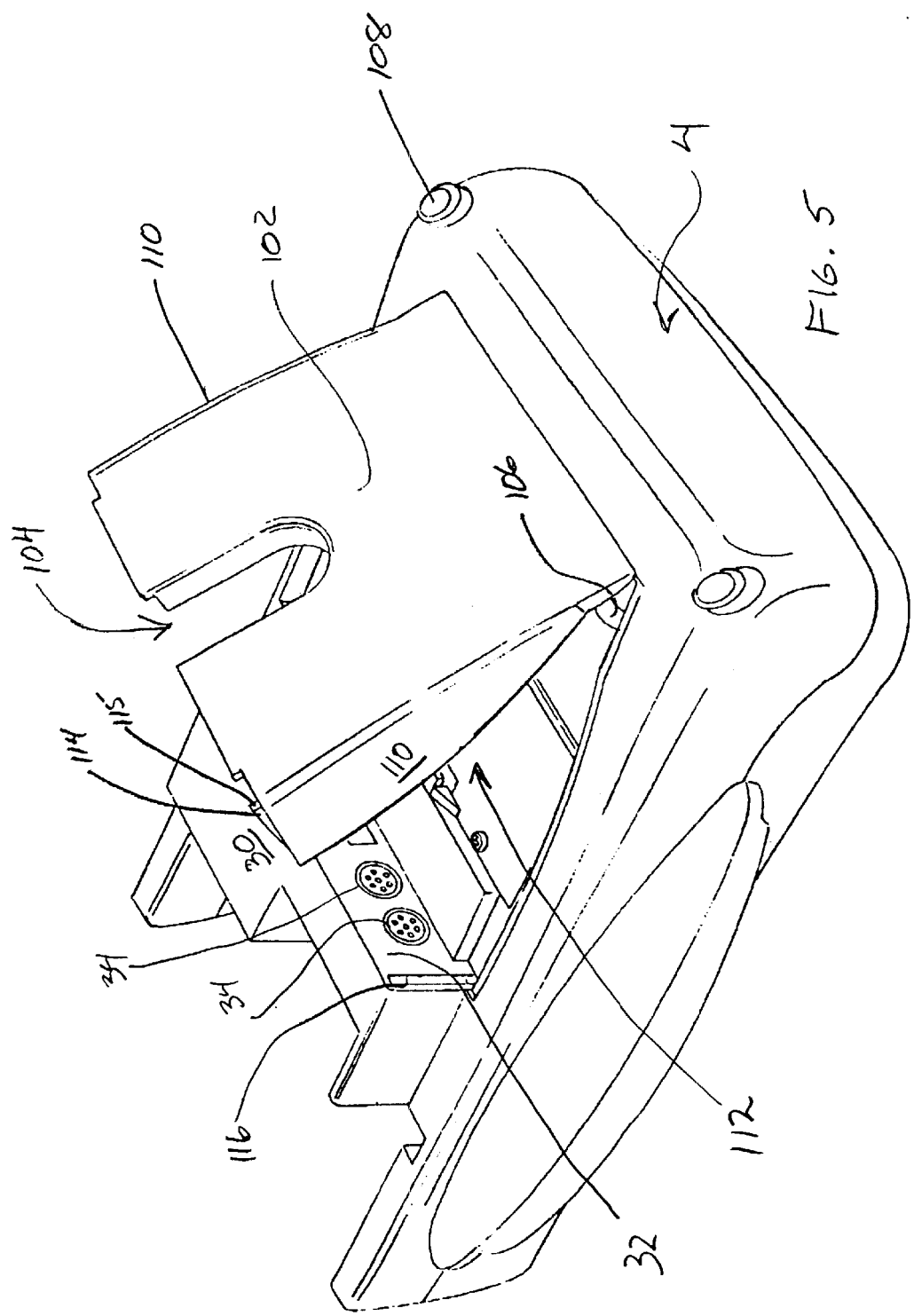
FIG. 5 is a perspective view of the terminal module with the touch screen facing downwardly.

The lower surface of the transaction module 2 is shown in FIG. 5. The stub block 30 includes on the vertical face 32, a series of input/output ports 34. The stub block 30 cooperates with the hinged cover 102 for defining an enclosure which contains and organizes any cables which are connected to the transaction module. It is noted that the printer module is connected to the terminal by the separate connectors 24 and 54. Further details of the ports are shown in FIG. 6.

Figure 16B:
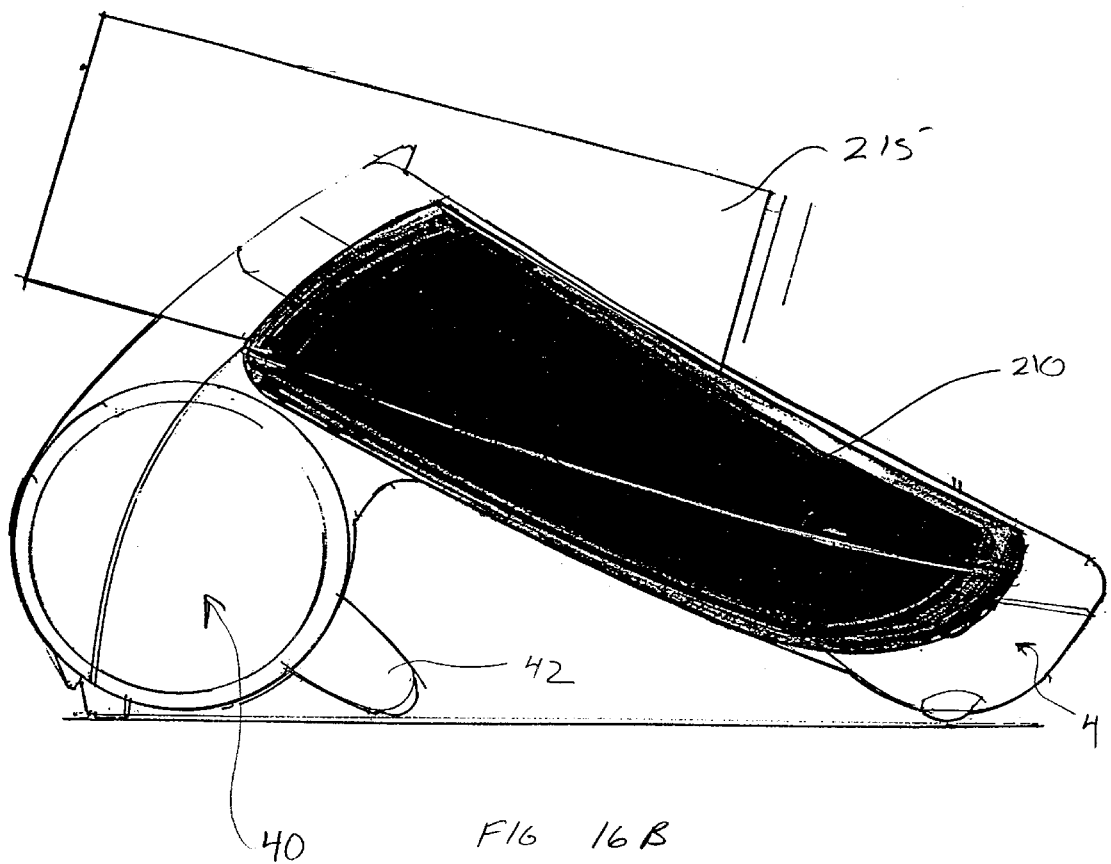
FIG. 16B is a sideview of the printer module of FIG. 16A.
Figure 17:
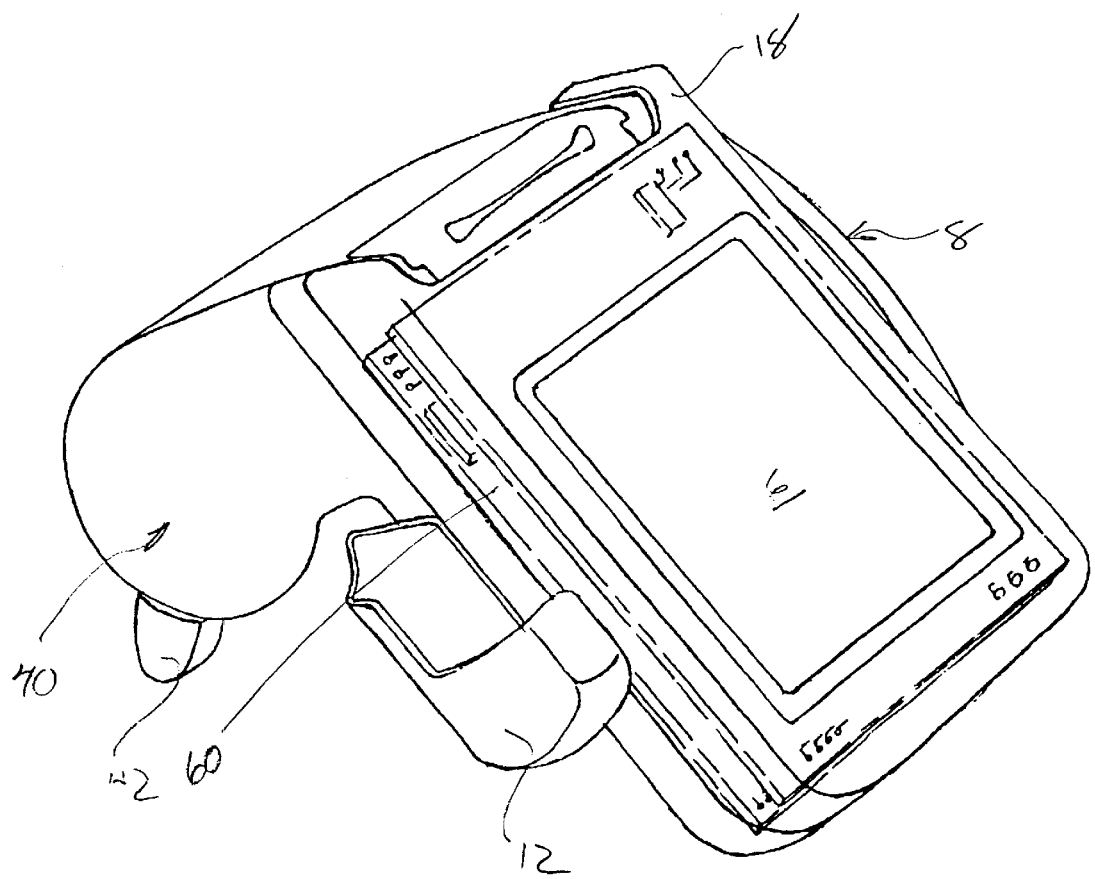
FIG. 17 is a partial exploded perspective view showing part of a printed circuit board of the terminal module.

The cable collection cavity 112 includes a removable cover 140 which is secured by bolts 142 to the transaction module. Beneath this cover are four SIM (Subscriber Interface Card) sockets 144. The SIM cards are not normally end user replaceable and include circuit protection. These cards are replaceable by qualified service personnel. Additionally, the rear surface of the transaction module includes a further multi pin connection port 150. The connecting socket is located at the base of the port 150. Also two threaded ports 151 and 153 are provided either side of this connection port 150 for mechanically securing an accessory to the side of the terminal. These ports are used for securing of the holder 12 or the holder can be removed and a cheque reader 200 received and supported as shown in FIGS. 16A and 16B. This type of connection avoids a cable connection and simplifies the device for the end user.

The hinged cover 102 includes cover sidewalls which cooperate with the stub block for completing the enclosure.

Figure 6:
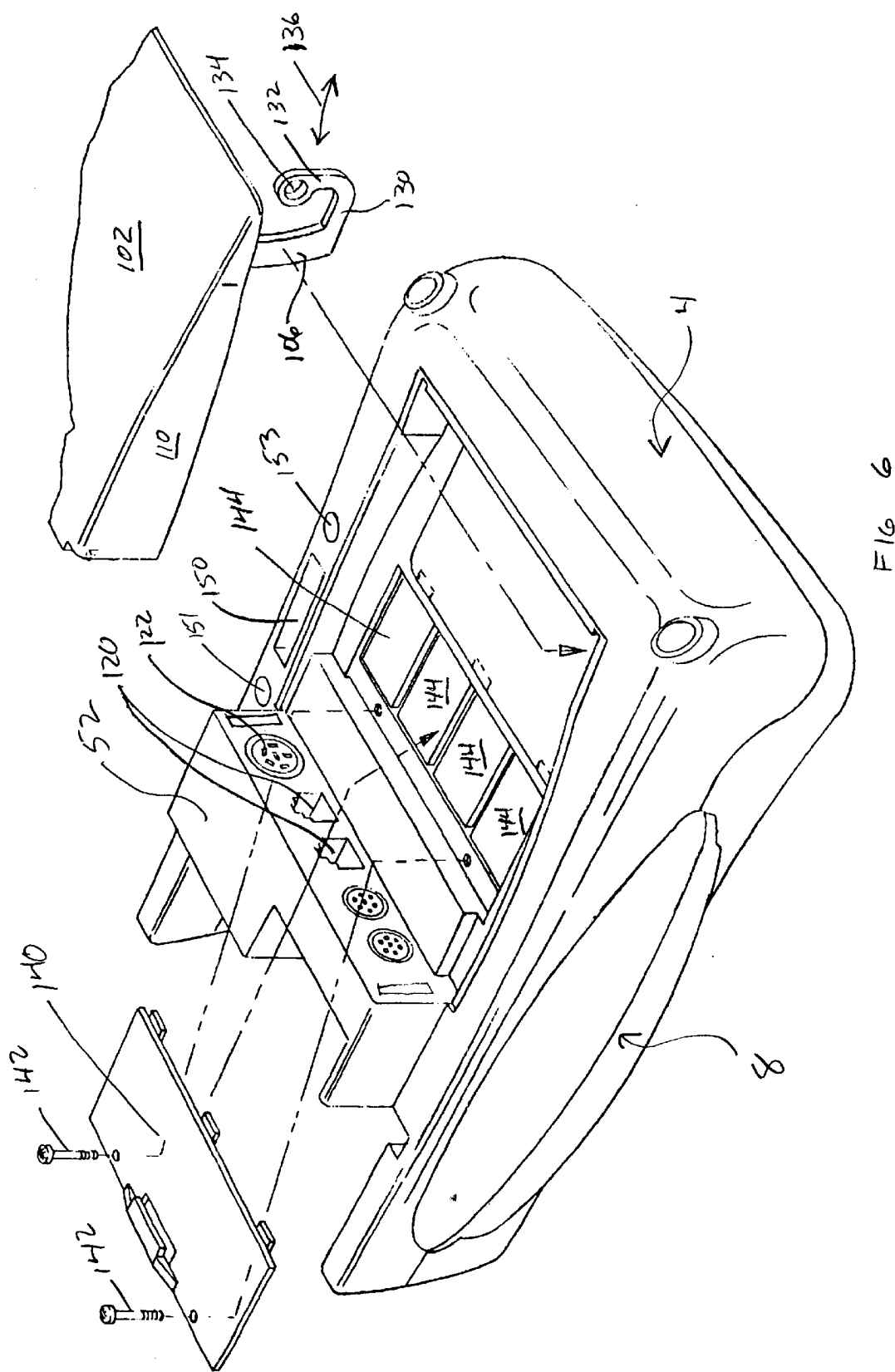
FIG. 6 is an exploded perspective view showing certain components of the transaction module.

FIG. 6 shows some details of the hinged cover 102 and an integral spring arm 106. The spring arm extends from one end of the cover and includes a hinge port 134 at the free end thereof for engaging a stub member of the housing of the transaction module. The port 134 is supported by the cantilevered arm 132 which is connected to the extension arm 130 extending from the projection 106. This arrangement defines the spring arm 106 where the resiliency of the plastic accommodates limited movement in the direction 136 of the cover 102 relative to the housing.

Locking of the lid can be appreciated from FIG. 5. The free end of the cover 102 has cam members 114 located on either side of the cover which cooperate with the grooves 116 provided in the stub block 30. As the cover is brought into engagement with the stub block, the cams 114 engage the grooves 116 and force the cover to move somewhat forwardly to accommodate movement of the cam member over the stub block. Once the cam member clears the back edge of the groove 116, the face 115 of the cam member snaps into the groove and allows the cover to return rearwardly. This movement of the cover is caused by the spring arms 106 which return to a non stressed state.

Figure 7:
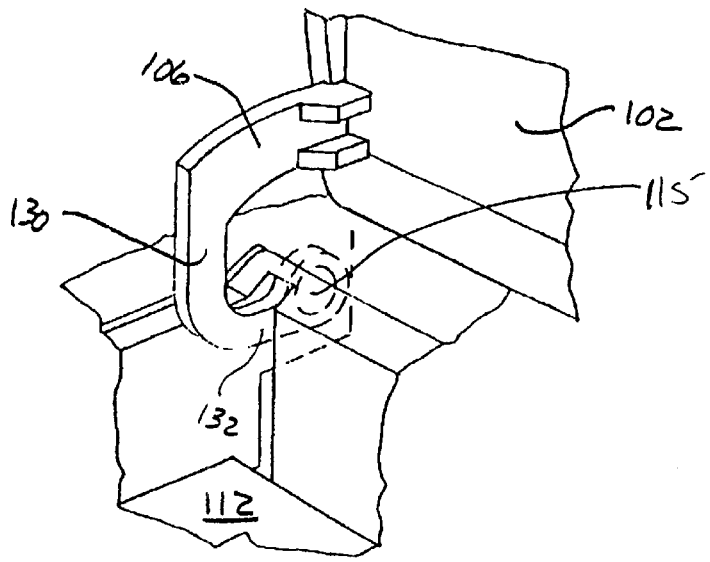
FIG. 7 is a partial perspective view showing details of a hinge arm of a cover member.
Figure 8:
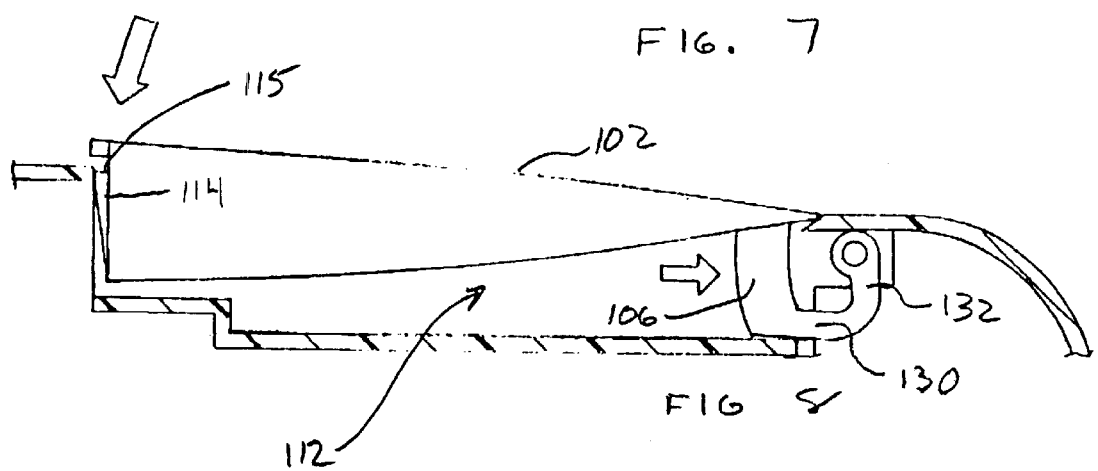
FIG. 8 is sectional view showing the movement of the hinge cover to a locked position.
Figure 9:
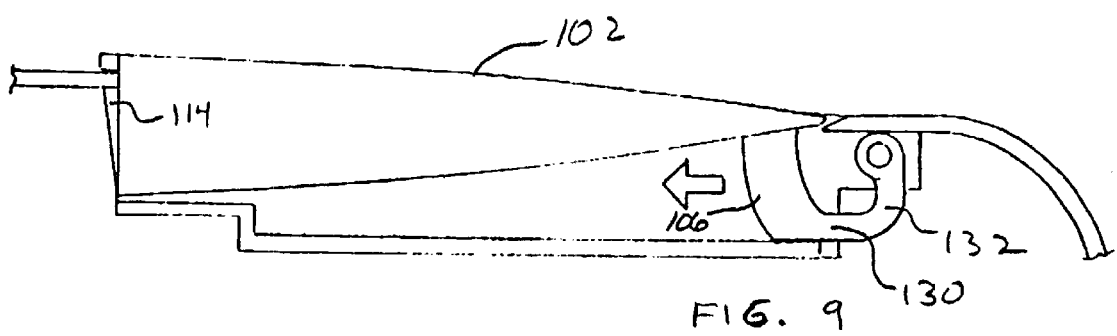
FIG. 9 is a view similar to FIG. 8 with the cover in the locked position.

Details of the securement of the spring arms 106 to the transaction module are shown in FIG. 7. The spring arms hook onto circular stubs 115 of the housing of the transaction module. Details of the movement of the cover during the closing thereof, is shown in FIG. 8 and FIG. 9 shows the cover in a closed condition.

Figure 10:
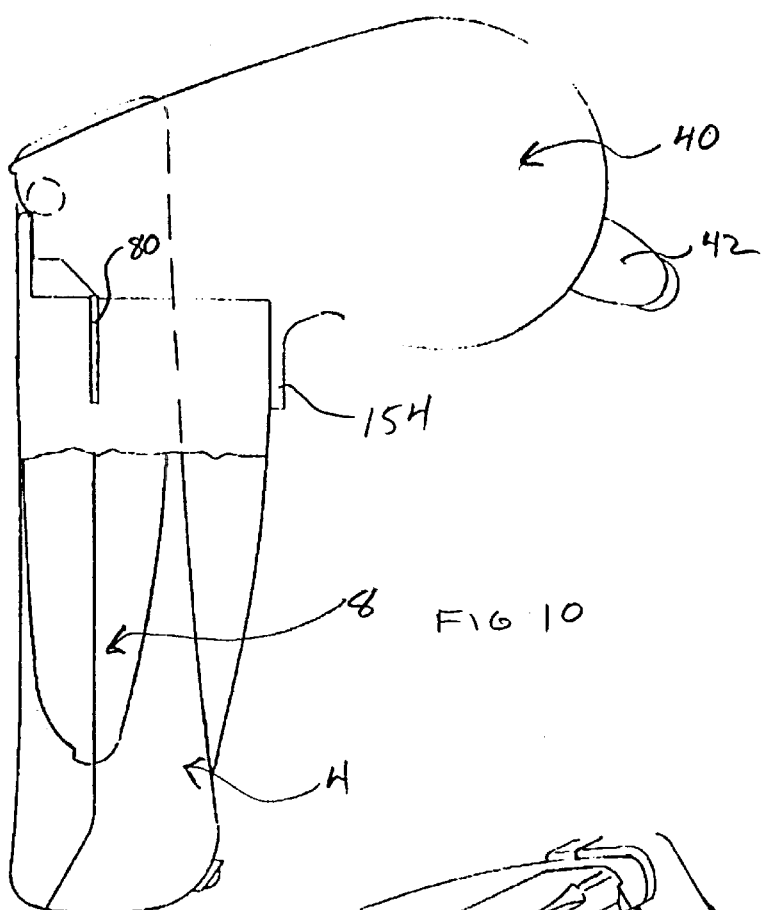
FIG. 10 is a side view of the transaction terminal with partial cutaway, a memory card locked in place due to the securement of the two modules.

FIG. 10 shows the overlapping relationship of the printer module and the transaction module. The bottom surface of the printer module includes an extending support flange 154 which engages the bottom of the transaction module and the flange wraps either side of the transaction module to further improve the securement.

Figure 11:
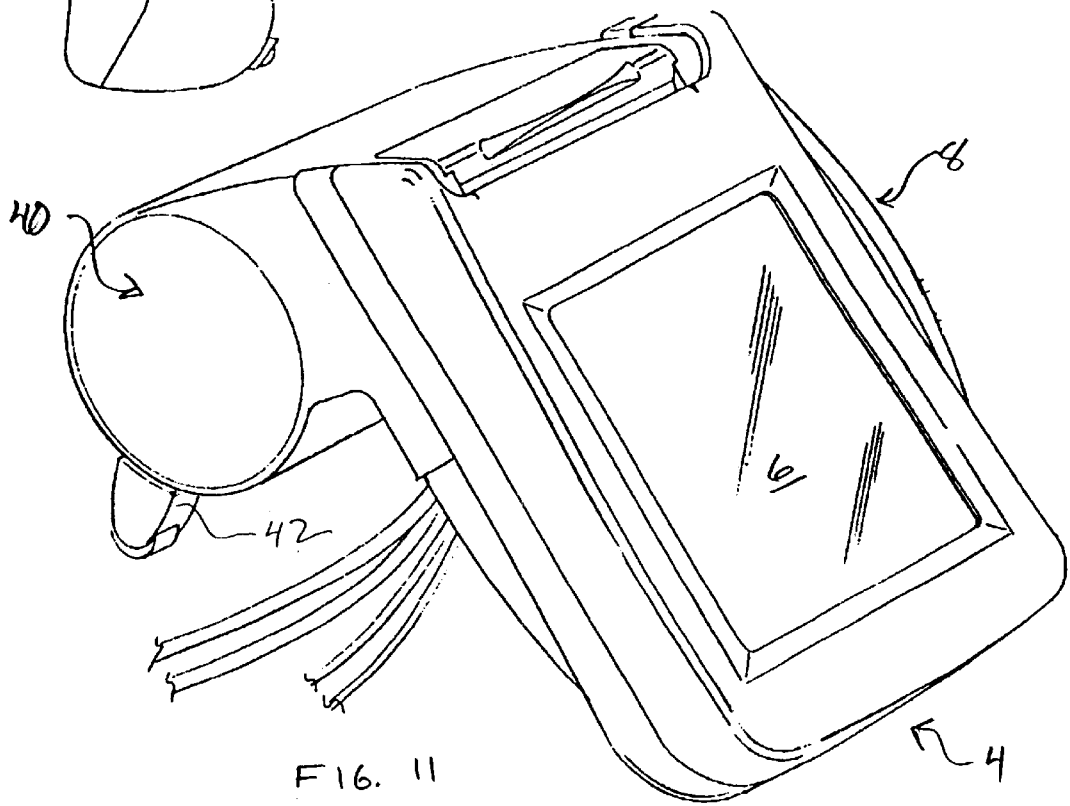
FIG. 11 is a partial perspective view showing various cables entering wand leaving the base of the transaction module

The angled assembled condition of the two modules and the large space beneath the transaction module to allow any cables to pass in or out of the device is clearly shown in FIG. 11. Any excess length of cables can be stored in the cable cavity 112.

Figure 12:
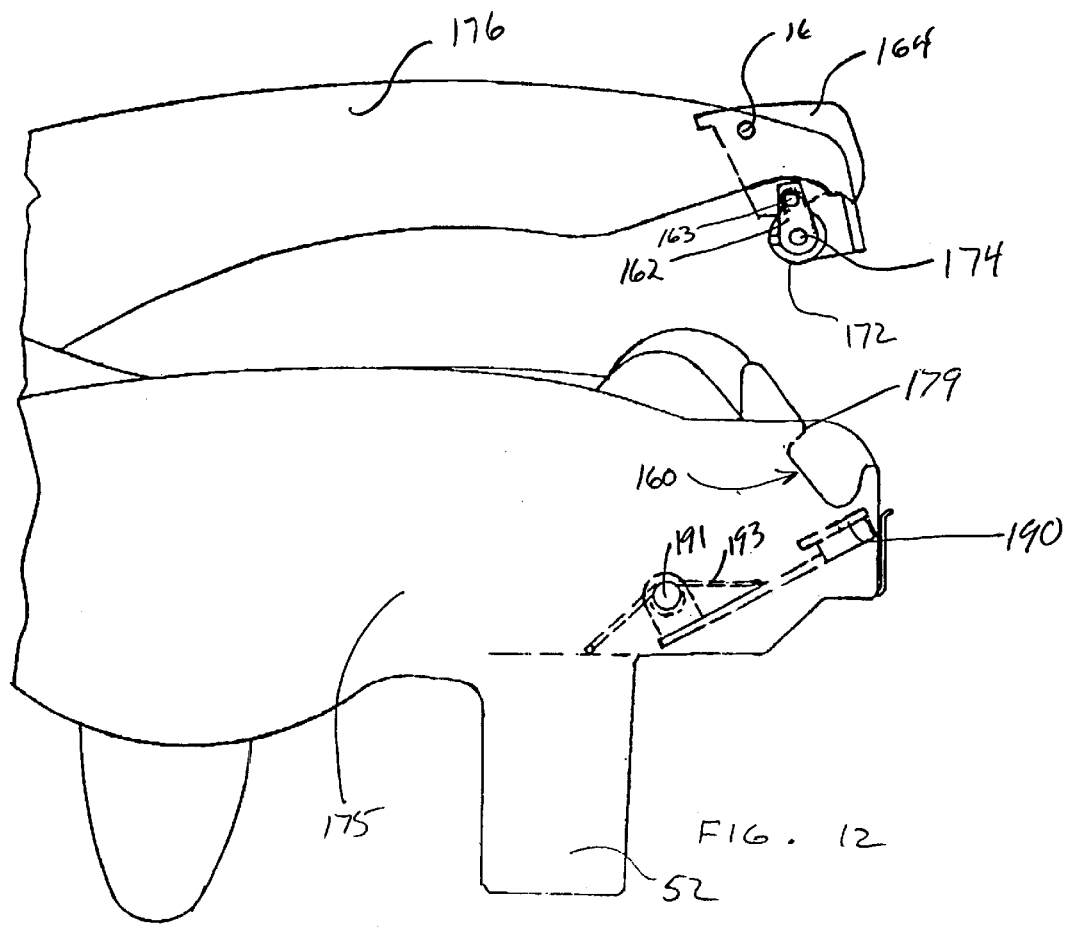
FIG. 12 is a partial side view showing details of a spring biased latch arrangement of the printer module.
Figure 13:
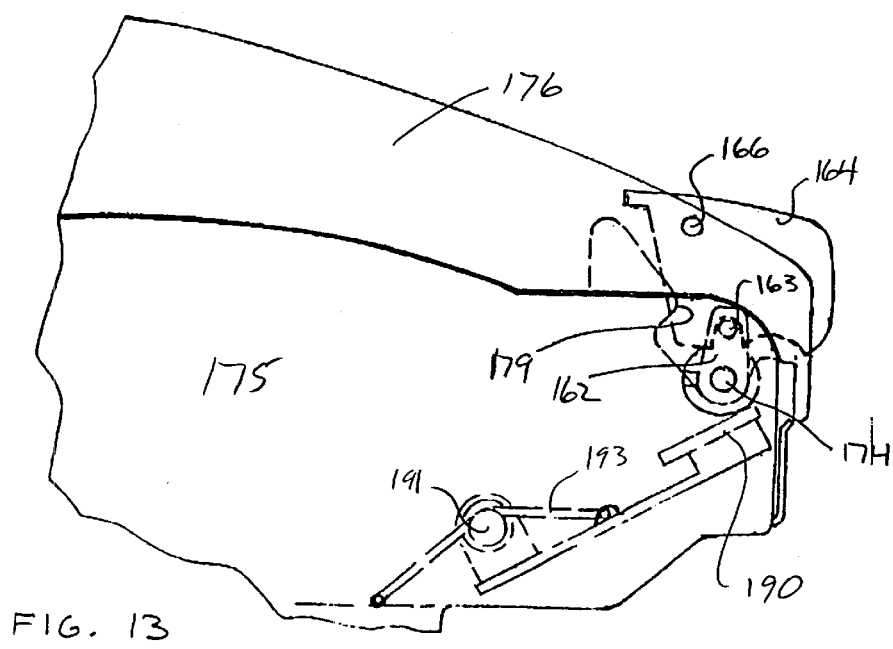
FIG. 13 shows a side view of part of the cover of the printer module about to be moved to a locked position.
Figure 14:
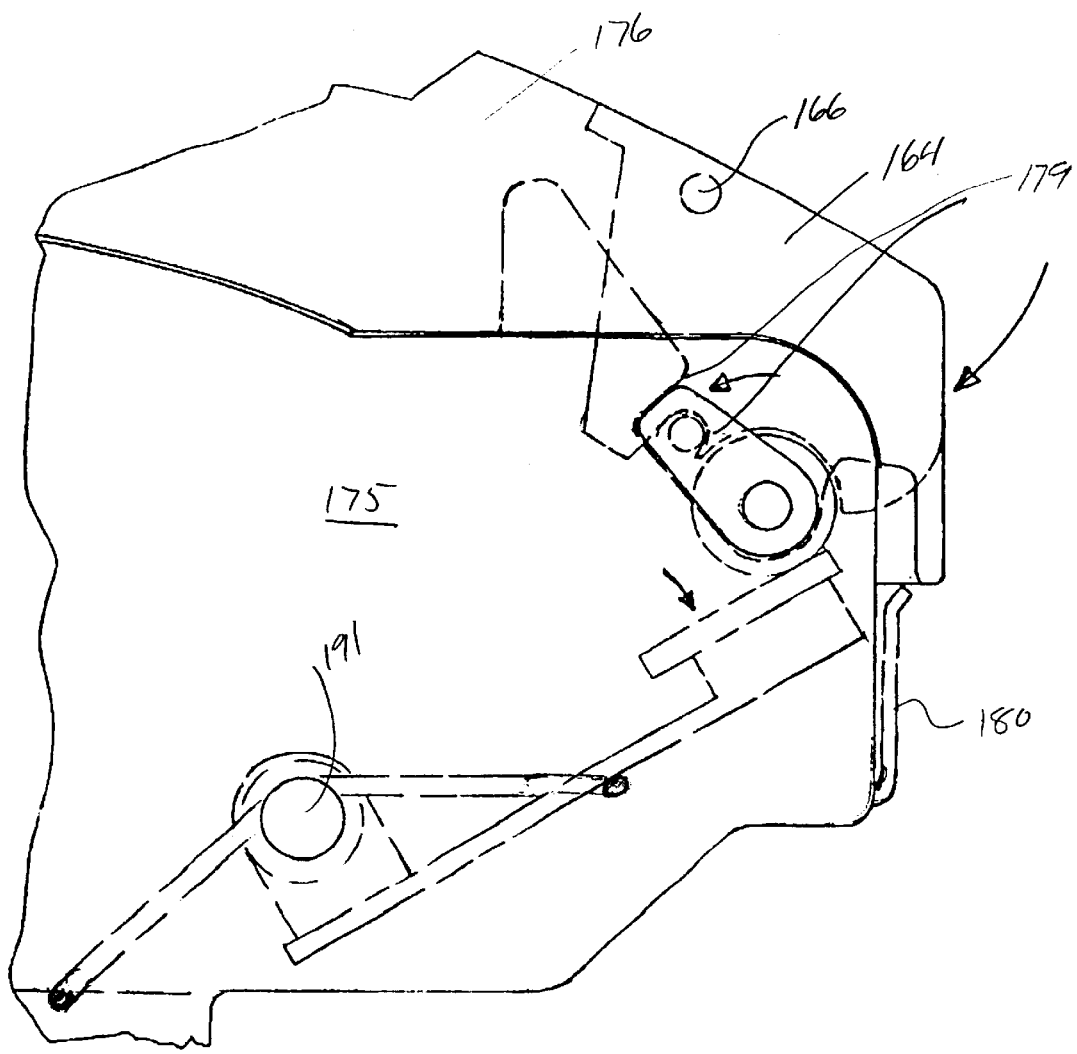
FIG. 14 is a partial side view showing locking of the cover of the printer module.

A particular latch closure of the printer module is shown in FIGS. 12, 13 and 14. The printer module includes a hinged cover member 176 having pressure roller 172 engaging the thermal printing head 190. Paper stored in the printing module is fed over the printing head and is pressed against the spring loaded printing head by the pressure roller 172. A release handle 164 is pivoted at 166 to the lid 176. This release handle also includes a recess 168 which engages an extension 163 of the locking arm 162. With the release handle 164 in an open position as shown in FIG. 12, the arm 162 extends upwardly. The cover 176 may be brought into engagement with the base of the printing module and the locking arm will take a position generally as shown in FIG. 13. The cover 176 generally meets with the bottom portion of the housing 175 and essentially closes.

The pressure roller, prior to bottoming out in the recess 160 of the bottom of the housing of the print module loosely contacts the spring loaded printing head 190. This printing head is pivotally supported and pivots about point 191. The spring 193 biases the head to the position of FIG. 12.

During closing of the cover member 176, the pressure roller 172 bottoms out on the printing head. In this position, the latch 164 is then activated to pivot around the point 166. This pivoting action also causes the locking arm 162 to pivot about point 174 and engage the edge 179 of the recess 160. These components form a cam arrangement where the pressure roller engages and moves the spring biased thermal printing head 190. Each end of the pressure roller is supported by a spring arm of the lid. Closing of the latch causes the cam arrangement to displace the spring arms and the pressure roller against the thermal printing head and displaces the head against the spring bias. This provides a pressure on the paper providing good grip to advance with the pressure roller and good contact with the printing head.

The printing head is displaced downwardly due to the camming of the arm 162 as the release handle is moved to the locked position of FIG. 14. The printing head moves down and provides a spring bias maintaining the arm 162 locked in the recess 160. It is released by pulling on the release handle 164 which allows the cover 176 to move upwardly and the thermal printing head moves several degrees in a counter clockwise direction around the pivot point 191.

With this arrangement, proper pressure between the roller 172 and the thermal printing head 190 is maintained. The pressure roller 172 is also driven by gears provided at the side of the printer module and advances the paper in accordance with a stepping motor provided in the printer module. The printer module communicates with the transaction module through the plug type connections and the actual control signal for the motor is provided by the transaction module. In this way, the printer module does not have a processor and processing of the print function is carried out by the transaction module.

The print module also includes a fixed paper tear bar 180 secure adjacent the discharge port 44. A paper out sensor is also provided adjacent the print head.

Figure 15:
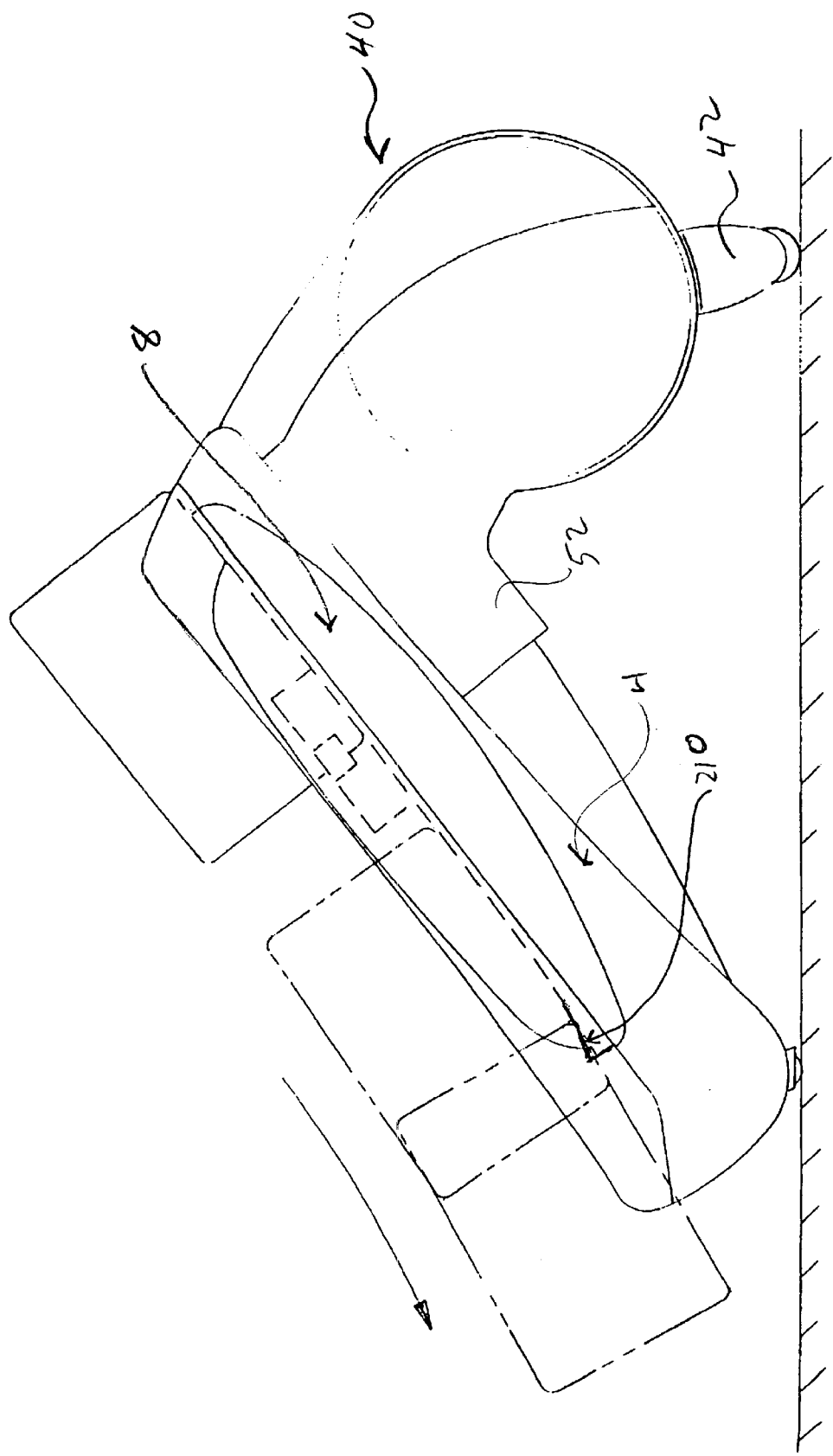
FIG. 15 is a side elevational view showing an improvement to the magnetic card slot with a change of direction ramp at the exit to the slot.

FIG. 15 shows a further feature of the invention where the magnetic stripe card reader is of a conventional design with respect to a major portion of the slide, however, the bottom of the slide closest to what will be the horizontal support surface includes a discharge ramp 200 which causes a change in angle of the card as it is being discharged during a downward sliding of the card. This prevents the card striking the horizontal support surface and encourages the timing of the action of the user to pull up on the card. This arrangement has been found to ease the modification for swiping of cards to accommodate the angling of the transaction module.

It can also be seen that the slide assembly has been supported at an elevated position and on part of one of the extensions 18. In this way the operating portion of the slide has been shifted upwardly providing additional clearance near the base of the unit for removal of the card.

The extensions 18 also serve to enhance the securement of the printer module to the transaction module and improve the overall appearance of the terminal such that it appears to be an integral device. Should there be a need to service either the printer module or the terminal module, this is accomplished by merely replacing the faulty module. If the transaction module is in need of repair, the user can remove the memory card 80 and insert it in a new terminal module. This card includes the financial information, the operating system and other components for operating the device. This memory card can come in various storage capacities and it also provides a simple way for updating the operating system and implementing any improvements to the terminal.

The SIM cards located in the base of the terminal allow use of the device with different types of smart cards. A smart card includes an electronic storage of funds on the card which is appropriately reduced for payment of purchases. There are a number of providers of this type of service and they all include their own protocols and procedures for executing this payment option. The provision of the four SIM receptors in the base of the terminal accommodates four different providers.

A check reader 200 of FIGS. 16A and 16B includes its own electrical connector which mates with a multi pin connector on a circuit board of the device and exposed connection port 150. Bolts connect the check reader to the threaded ports 151 and 153. A slot 210 provides a guideway for sliding a check 215 past a read head. The touch screen is used to enter any information for the check payment transaction.

In some embodiments, a check reader is not required and port 150 is closed. The check reader and/or the base of the terminal can include a further mounting position for the holder 12.

Figure 18:
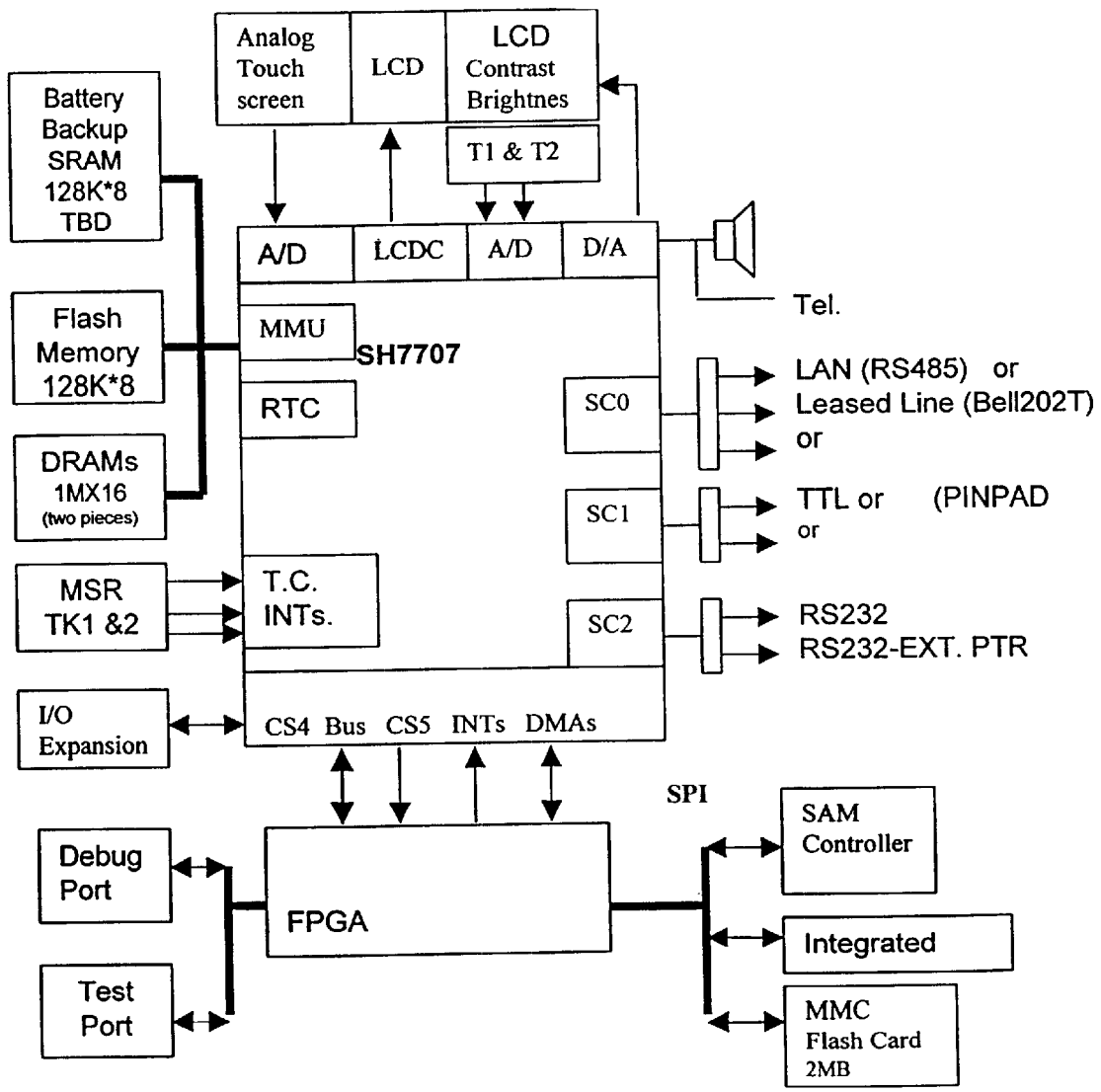
FIG. 18 is a schematic of the components of the terminal module.

The schematic layout of FIG. 18 shows the various ports provided with the terminal module and the connection of the terminal module with telephone lines, the printer module, an expansion module and the other components of the system. With the operation of various payment options, the PIN entry device 70 can also include a smart card entry slot for accommodating transactions.

The terminal device has been described with respect to financial transactions, however, it does have application for other types of transactions such as health card transactions, as but one example. Smart Cards allow the storage of information on the card and this has particular benefits with respect to health services. A person can have on his own card, all of the particulars to uniquely identify the person, as well as critical health records and health history. The printer module in these applications provides a paper copy of the information that has been added to the file history and can also be used for signature purposes to confirm that a particular service has been performed.

It can therefore be appreciated that this transaction device has a number of different uses and is not confined to the financial transaction field.

Although various preferred embodiments of the present invention have been described herein in detail, it will be appreciated by those skilled in the art, that variations may be made thereto without departing from the spirit of the invention or the scope of the appended claims.

The embodiments of the invention in which an exclusive property or privilege is claimed are defined as follows:

1. A transaction device comprising a terminal module and a printer module, said terminal module including a processor, touch screen input and display means, application memory means, data storage means, an electrical plug type connection for communicating with said printer module, and input and output ports; said printer module including a paper supply roll cavity, a printing head, a paper drive arrangement, paper outlet and an electrical plug type connection for communicating with said terminal module, said terminal module and said printer module including a mechanical securement therebetween, said modules when mechanically secured and supported on a horizontal surface orientating said touch screen input and display means at an upwardly and rearwardly extending angle relative to horizontal; and wherein said terminal module and said printer module when secured form an electrical cable access gap beneath said terminal module, and wherein said input and output ports are located on a bottom surface of said terminal module and are accessible through said cable access gap.

2. A transaction device as claimed in claim 1 wherein said printer module has a generally vertical orientation with said paper supply roll cavity adjacent a base portion of said printer module, and wherein a front edge of said printer module supports a rear edge of said terminal module and orientates said terminal module at said upwardly and rearwardly extending angle.

3. A transaction device as claimed in claim 2 wherein said printer module has a generally vertically split housing which is releasably closed to provide access to said paper supply roll cavity and accessible with said terminal module secured to said printer module.

4. A transaction device as claimed in claim 3 said terminal module and said printer module each have a longitudinal axis which are generally perpendicular.

5. A transaction device as claimed in claim 2 wherein said terminal module includes two side extensions forming a "U" shaped gap and a paper discharge end of said printer module fits within said gap.

6. A transaction device as claimed in claim 1 wherein said mechanical securement also maintains said plug type connection of said printer module in engagement with said plug type connection of said terminal module.

7. A transaction device as claimed in claim 6 wherein said printer includes an adjustable support for supporting the rear edge of said printer module in at least two different positions, said two different positions causing the angle of said touch screen input and output display means to vary relative to horizontal at least 5°.

8. A transaction device as claimed in claim 7 wherein said adjustable support is a pivoting leg structure rotatable between two end positions defining said at least two positions.

9. A transaction device as claimed in claim 8 wherein said printer cooperates with said terminal module to define therebetween a slot through which paper of the print module passes as it is discharged from said print module.

10. A transaction device as claimed in claim 9 wherein said terminal module includes secured thereto a paper tear bar for tearing of a discharged paper strip from a supply roll of paper contained in said printer module.

11. A transaction device as claimed in claim 1 wherein said terminal module includes an injection molded housing and said printer module includes an injection molded housing, and wherein said housings including interlocking members which form a plug connection on said housings and form part of said mechanical securement.

12. A transaction device as claimed in claim 1 wherein said terminal module and said printer module when secured form an said electrical cable access gap beneath said terminal module and extending to either side of said terminal.

13. A transaction device as claimed in claim 12 wherein said terminal module on a base includes a recessed cable connection cavity and said input and output ports are located in a wall of said cavity.

14. A transaction device as claimed in claim 13 wherein said cavity includes a hinged cover member with a cable slot in one edge thereof, said cover member forming a spring catch with said housing to releasably maintain said cover in a closed condition.

15. A transaction device as claimed in claim 14 wherein said cover is connected by a hinge adjacent said front edge and said cavity forms a majority portion of a back face of said terminal module.

16. A transaction device as claimed in claim 13 wherein said recessed cable connection cavity includes therein a further cavity having removable memory cards and said further cavity is closed by a removable cover.

17. A transaction device as claimed in claim 16 wherein said removable cover is mechanically secured and requires a tool to allow access to said removable memory cards.

18. A transaction device as claimed in claim 1 wherein said printer module includes two extending side members at one end of said terminal module which define a channel therebetween which receives a paper discharge end of said printer nodule, said side members and said discharge end of said printer module including slide engaging members which assist in alignment of said modules for connection and reinforce the mechanical connection of said modules.

19. A transaction device as claimed in claim 18 wherein each side member includes a recessed keyway and said recessed keyways face one another on open upon said channel between said side members, said printer module on said paper discharge end including extending key members which form a slide fit with said keyways.

20. A transaction device as claimed in claim 19 wherein said key members and said recessed slots align said electrical plug type connections for connection which is completed automatically during mechanical connection of said modules.

21. A transaction device as claimed in claim 19 wherein said terminal module includes a removable memory card in an end of said terminal that is inaccessible when said printer module is mechanically secured to said terminal module.

22. A transaction device as claimed in claim 1 wherein said printer module includes a thermal printing head which cooperates with a pressure roller which presses paper against said thermal printing head, said thermal printing head including a spring bias urging said printing head against said pressure roller, said printing module including a split housing with said thermal printing head supported in one half of said housing and said pressure roller mounted in the other part of said split housing.

23. A transaction device as claimed in claim 1 wherein said terminal module includes a slide slot for guiding and reading information on a magnetic stripe of a user card, said slide slot being positioned at one side of said terminal module and including a discharge transition ramp at a bottom portion of said slot for changing the angle of discharge of a user card leaving the bottom of said slot.

24. In a transaction device having a transaction terminal module and a printer module, an improved printer module comprising a two piece split housing enclosing a paper supply roll cavity, a printing head, and a paper drive arrangement; said printer module including a paper outlet adjacent said printing head and an electrical plug type connection with said terminal module for communicating therewith, said printing head cooperating with a pressure roller which presses paper against said printing head, said printing head including a spring bias urging said printing head against said pressure roller; said printer module including a latch arrangement for releasably maintaining said split split housing in a closed condition, said latch arrangement and said pressure roller being secured in a first part of said split housing and said print head being secured in a second part of said split housing, said first and second parts being hingedly connected and movable between an open and a closed condition, said latch arrangement in an open position thereof allowing said split housing to close whereafter movement of said latch arrangement to a closed position forces said pressure roller to move said printing head against said spring bias and maintain a pressure relationship therebetween, said latch arrangement in said closed position engaging a catch member on said second part of said split housing to maintain said split housing in said closed condition until said latch arrangement is moved to said open position.

25. In a transaction device as claimed in claim 24 wherein said latch arrangement is partially maintained in said closed condition by said spring bias.

26. In a transaction terminal as claimed in claim 25 wherein said latch arrangement and said pressure roller are located in one part of said split housing and said printing head is located in the opposite part of said split housing.

27. In a transaction terminal as claimed in claim 26 wherein closing of said latch causes said pressure roller to displace said printing head against said spring bias.

28. A printer module for a transaction device comprising a split housing maintained in a closed condition by a releasable latch, a spring loaded thermal print head secured in one part of said split housing and a pressure roller and latch arrangement in a second part of said split housing, said latch arrangement when closed urging said pressure roller against said thermal printing head displacing the thermal printing against said spring bias, said latch arrangement including a cam arrangement which positions said pressure roller in a clear position relative to said thermal print head when said latch is open and said housing is closed, said cam arrangement displacing said pressure roller and said thermal print head when said housing is closed and said latch arrangement is moved to a closed position.

29. A printer module as claimed in claim 28 wherein said spring loaded thermal print head provides a bias force serving to maintain said latch in said closed position which bias force is overcome by opening of said latch.

30. A printer module as claimed in claim 28 wherein said pressure roller is supported at either end thereof in a cantilevered manner to form spring arms allowing displacement of said pressure roller against said thermal print head when said latch arrangement is closed.

31. A printer module as claimed in claim 28 wherein said cam arrangement cooperates with a cam track provided on said one part of said split housing and said latch arrangement includes a mechanical linkage to assist in closing of said latch arrangement.

32. A printer module as claimed in claim 31 wherein said pressure roller includes a rotatable shaft supported by spring arms of said housing, said rotatable shaft including a cam member sleeved on one end of said shaft with the position of said cam controlled by said latch arrangement, and wherein movement of said latch arrangement to said closed position causes an cam track to force said cam member and said pressure roller toward said spring loaded printing head and cause movement thereof against said spring bias.

33. A printer module as claimed in claim 32 wherein said rotatable shaft includes a further cam member on the opposite end of said shaft with the position thereof controlled by said latch such that said cams move together, and wherein a further cam track is provided on said one part of said split housing and cooperates with said further cain member to cause said further cam and said pressure roller to move said spring loaded printing head during movement of said latch to said closed position.

* * * * *